US010353503B2

(12) United States Patent
Shih et al.

(10) Patent No.: US 10,353,503 B2
(45) Date of Patent: Jul. 16, 2019

(54) INTEGRATED FORCE SENSING ELEMENT

(71) Applicant: Texas Instruments Incorporated, Dallas, TX (US)

(72) Inventors: Wei-Yan Shih, Plano, TX (US); Steve Kummerl, Carrollton, TX (US); Mark Stephen Toth, Murphy, TX (US); Alok Lohia, Dallas, TX (US); Terry Lee Sculley, Lewisville, TX (US); Seung Bae Lee, Dallas, TX (US); Scott Robert Summerfelt, Garland, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 504 days.

(21) Appl. No.: 14/926,265

(22) Filed: Oct. 29, 2015

(65) Prior Publication Data

US 2017/0123548 A1    May 4, 2017

(51) Int. Cl.
*G06F 3/041* (2006.01)

(52) U.S. Cl.
CPC .......... *G06F 3/0414* (2013.01); *G06F 3/0416* (2013.01)

(58) Field of Classification Search
CPC . G01R 29/22; H01L 41/0825; H01L 41/1132; H01L 41/113; H01L 41/0973; H01L 41/1138; H01L 41/25; H01L 41/273; H01L 41/277; H01L 41/29; H01L 41/311; G01F 3/0414; G01F 3/045; G01L 1/18; G01L 1/2295; G01L 1/2293; G01L 5/0019; G01L 5/161; G01L 5/162; G01L 5/165; G01L 5/167; G01L 19/145
See application file for complete search history.

(56) References Cited

U.S. PATENT DOCUMENTS

| 4,071,691 | A | * | 1/1978 | Pepper, Jr. | G06F 3/041 178/18.05 |
| 4,853,669 | A | * | 8/1989 | Guckel | B81C 1/00333 338/4 |
| 4,972,713 | A | * | 11/1990 | Iwata | B60R 25/1006 310/329 |
| 5,134,887 | A | * | 8/1992 | Bell | G01L 9/0042 361/283.4 |
| 5,397,911 | A | * | 3/1995 | Hiyama | G01P 15/124 257/415 |
| 5,815,900 | A | * | 10/1998 | Ichikawa | H03H 3/10 29/25.35 |
| 5,915,267 | A | * | 6/1999 | Kim | G01R 29/22 73/1.15 |
| 6,221,023 | B1 | * | 4/2001 | Matsuba | A61B 5/0215 600/486 |
| 7,287,433 | B2 | * | 10/2007 | Tanaka | G01L 19/147 73/727 |
| 7,901,729 | B2 | * | 3/2011 | Nanataki | C01G 23/003 29/25.35 |

(Continued)

*Primary Examiner* — Harshad R Patel
*Assistant Examiner* — Tran M. Tran
(74) *Attorney, Agent, or Firm* — Michael A. Davis, Jr.; Charles A. Brill; Frank D. Cimino

(57) ABSTRACT

An integrated force sensing element includes a piezoelectric sensor formed in an integrated circuit (IC) chip and a strain gauge at least partially overlying the piezoelectric sensor, where the piezoelectric sensor is able to flex. A human-machine interface using the integrated force sensing element may include a conditioning circuit, temperature gauge, FRAM and a processor core.

19 Claims, 7 Drawing Sheets

(56) References Cited

U.S. PATENT DOCUMENTS

| | | | | |
|---|---|---|---|---|
| 7,934,430 B2* | 5/2011 | Irving | | G01L 1/2262 |
| | | | | 73/795 |
| 8,004,154 B2* | 8/2011 | Cueff | | H01L 41/094 |
| | | | | 310/324 |
| 8,123,966 B2* | 2/2012 | Kubo | | H03H 3/02 |
| | | | | 216/18 |
| 8,250,925 B2* | 8/2012 | Benzel | | G01L 19/0627 |
| | | | | 361/283.4 |
| 8,305,358 B2* | 11/2012 | Klinghult | | G06F 3/0414 |
| | | | | 178/18.05 |
| 8,384,679 B2* | 2/2013 | Paleczny | | G06F 3/016 |
| | | | | 178/18.01 |
| 8,436,806 B2* | 5/2013 | Almalki | | G06F 3/0414 |
| | | | | 345/104 |
| 8,479,585 B2* | 7/2013 | Shaw-Klein | | H01L 41/081 |
| | | | | 73/777 |
| 8,508,105 B2* | 8/2013 | Kang | | G01C 19/56 |
| | | | | 310/329 |
| 8,549,715 B2* | 10/2013 | Kim | | H04R 17/005 |
| | | | | 29/25.35 |
| 8,723,241 B2* | 5/2014 | Udayakumar | | H01L 27/20 |
| | | | | 257/295 |
| 8,733,175 B2* | 5/2014 | Ooya | | G01L 19/04 |
| | | | | 73/706 |
| 8,988,384 B2* | 3/2015 | Krah | | G06F 3/0414 |
| | | | | 178/18.05 |
| 9,196,820 B2* | 11/2015 | Benwadih | | G01L 9/008 |
| 9,337,751 B2* | 5/2016 | Horiguchi | | H01L 41/1136 |
| 9,350,319 B2* | 5/2016 | Mitchell | | G01N 29/2462 |
| 9,448,629 B2* | 9/2016 | Yamane | | G06F 3/041 |
| 9,568,385 B2* | 2/2017 | Yamada | | G01L 9/0042 |
| 9,690,408 B1* | 6/2017 | Krah | | G06F 3/0412 |
| 9,702,698 B2* | 7/2017 | Naono | | G01C 25/00 |
| 9,766,725 B2* | 9/2017 | Hou | | G06F 3/03545 |
| 2009/0065267 A1* | 3/2009 | Sato | | G01L 1/20 |
| | | | | 178/18.06 |
| 2013/0018489 A1* | 1/2013 | Grunthaner | | G06F 3/041 |
| | | | | 700/73 |
| 2013/0169113 A1* | 7/2013 | Lim | | H01L 41/1138 |
| | | | | 310/329 |
| 2013/0283922 A1* | 10/2013 | Qualtieri | | G01Q 10/045 |
| | | | | 73/774 |
| 2014/0092064 A1* | 4/2014 | Bernstein | | G06F 3/016 |
| | | | | 345/174 |
| 2015/0084914 A1* | 3/2015 | Kuroki | | G06F 3/0488 |
| | | | | 345/174 |
| 2015/0226618 A1 | 8/2015 | Shih | | |
| 2015/0296607 A1* | 10/2015 | Yang | | G01L 1/205 |
| | | | | 361/750 |

* cited by examiner

INTEGRATED FORCE SENSING ELEMENT

FIELD OF THE DISCLOSURE

Disclosed embodiments relate generally to the field of Human-Machine Interfaces (HMIs). More particularly, and not by way of any limitation, the present disclosure is directed an integrated force sensing element used in HMI.

BACKGROUND

Resistive and capacitive touch screens were developed for LCD displays as one form of user interface, i.e., a graphical interface. These touch screens are appropriate for large array applications but are expensive to manufacture. Touch screens are cost effective on "per pixel" basis when the array is large. For discrete "button" applications, however, touch screens tend to be costly compared with mechanical buttons. Prior art HMI suffer from following limitations:
- A capacitive touch HMI detects a permittivity increase due to the water content in the human body. They often fail with gloves on. If tuned for high sensitivity, spurious detections of water-containing or metallic objects passing by can be problematic.
- Resistive touch technology depends on conductive elements separated by a thin layer of polymer. The conductive element may form a resistive leakage path after repeated use or after extended exposure to pressure and/or humidity. Wear-out of the conductive elements after repeated contacts can also result in sporadic open circuit under use.
- Mechanical buttons, similarly, also suffer wear and tear over repeated use. In addition, they generally require holes in the control panel which allow water or contaminants to enter. This results in additional reliability concerns beyond the wear and tear due to movement.
- In addition to robustness concerns, none of the preceding HMI method could sense the force or speed of interaction (contact). An HMI that can correlate human sense of force and speed of contact, i.e., impact, will enhance user experience tremendously.

SUMMARY

The present patent application discloses a robust integrated force sensing element and HMI that sense contact through force and speed of interaction and can act as a switch. The device has the following features:
- A piezoelectric sensor element,
- A strain gauge, and
- An optional integrated circuit to detect and measure the signal coming from the piezoelectric sensor and strain gauge.

A piezoelectric sensor pumps charge and generates electric energy when stressed, e.g., when force is applied to the piezoelectric sensor. This sensor can detect change in stress versus time and is used to detect stress event changes. The piezoelectric sensor is connected to a high-pass circuit, which helps detect initial contact to the HMI due to a rapid momentum change, e.g., an impact. In an appropriate arrangement, the piezoelectric sensor can also detect momentum changes due to movement of the device. The piezoelectric sensor is not suitable for DC force measurement, but instead is used to differentiate speed of the stimuli. At the same force level, a faster stimulus generates a stronger signal; thus, urgency of the user action can be differentiated using the piezoelectric sensor. The strain gauge is configured to take DC force measurement and can detect long term stress changes. The strain gauge can, for example, be arranged to form a Wheatstone bridge.

By combining the two types of force sensors, an effective force or pressure-sensitive switch can be implemented. A circuit is connected to a low power comparator and can stay in low power mode until the piezoelectric element wakes the circuit. Since the circuit inevitably bleeds the charges generated by the piezoelectric element, the piezoelectric sensor is used to measure impact instead of the static (DC) force. To minimize power consumption, the strain gauge is dependent on a trigger from the piezoelectric circuit. Once the strain gauge is triggered, this sensor can be used to determine the absolute level of stress. Unlike previous solutions, the disclosed force sensing element can differentiate the force of contact, can differentiate speed of impact of contact, allows a multiple touch mode HMI (e.g., first touch to wake up, second touch to activate), and enables proportional haptic feedback using sensor data.

In one aspect, an embodiment of an integrated force sensing element is disclosed. The integrated force sensing element includes a piezoelectric sensor formed in an integrated circuit (IC) chip and a strain gauge at least partially overlying the piezoelectric sensor, wherein the piezoelectric sensor is able to flex.

In one aspect, an embodiment of a Human Machine Interface (HMI) is disclosed. The HMI includes an integrated circuit (IC) chip comprising an integrated force sensing element that comprises a piezoelectric sensor and a strain gauge, the strain gauge at least partially overlying the piezoelectric sensor, wherein the piezoelectric sensor is able to flex, a processor core, and a conditioning circuit attached to receive the output from the piezoelectric sensor and the strain gauge and to provide a conditioned signal to the processor core, wherein the processor core is operably connected to send a control signal to a device.

Advantages of the disclosed embodiments include:
Lower power consumption in steady-state mode;
New dimensions of HMI:
  Force;
  Impact;
Robustness:
  Very small motion, no electrode wear-out due to repeated electric contacts;
  Insensitive to environment moisture, water, metallic contaminants;
Ease of integration with CMOS electronics.

BRIEF DESCRIPTION OF THE DRAWINGS

Embodiments of the present disclosure are illustrated by way of example, and not by way of limitation, in the figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1A:
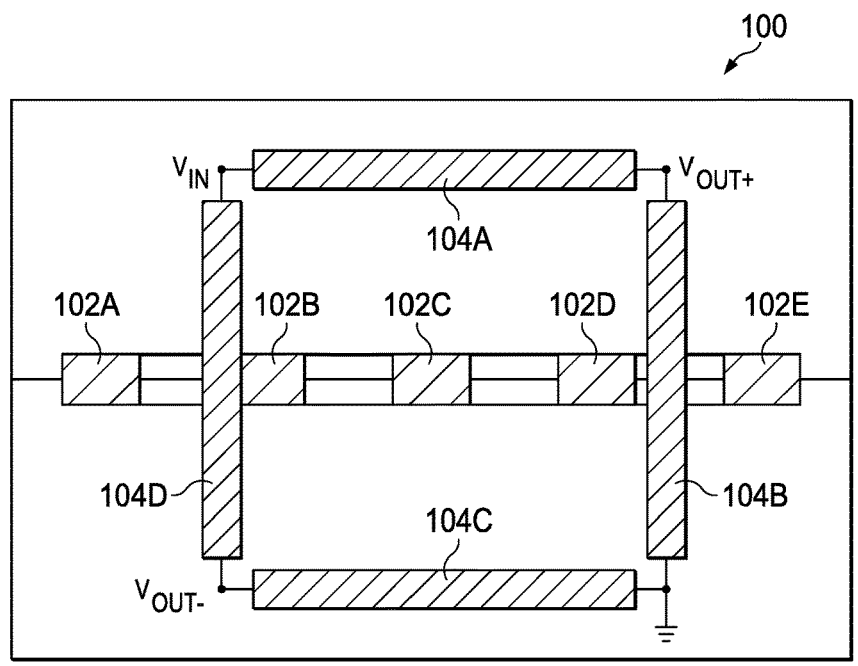
FIGS. 1A and 1B depict a top view and a side view of an example force sensing element according to an embodiment of the disclosure.
Figure 1B:
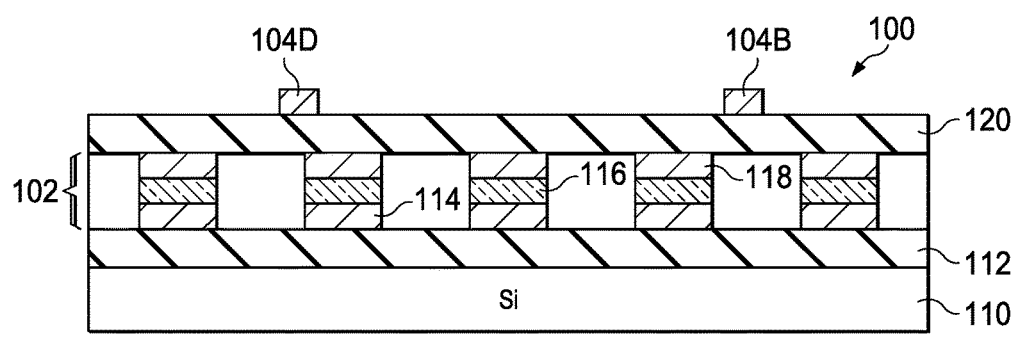

Referring now to the drawings and more particularly to FIGS. 1A and 1B, both top and side views of an integrated force sensing element 100 are shown according to an embodiment of the disclosure. Switch 100 includes piezoelectric sensor 102 and strain gauge 104. In the embodiment seen in this figure, piezoelectric sensor 102 includes an array of ferroelectric capacitors 102A, 102B, 102C, 102D and 102E connected in series, while strain gauge 104 includes a set of four thin film resistors 104A, 104B, 104C, 104D arranged to form a Wheatstone bridge. Strain gauge 104 partially overlies piezoelectric sensor 102 so that both sensors are receiving essentially the same strain. As seen in the side view, piezoelectric sensor 102 is formed on a dielectric film 112. Dielectric film 112 may be formed on silicon layer 110 as shown or may be formed in a subsequent layer. In at least one embodiment, formation of piezoelectric sensor 102 is coordinated with the formation of similar elements, e.g. a Ferroelectric Random Access Memory (FRAM). Piezoelectric element 102 has a lower electrode layer 114 and an upper electrode layer 118 separated by piezoelectric film layer 116. In at least one embodiment, piezoelectric film 116 is lead zirconate titanate (PZT). In an alternate embodiment the piezoelectric film may be aluminum nitride (AlN), zinc oxide (ZnO) or any other piezoelectric film that is known or unknown. Upper electrode layer 118 and lower electrode layer 114 may be of a metal, such as Ir, Ti, Pt, Pd, Au, Al, Ru, Rh, an oxide of a metal, or multilayered combinations thereof. In at least one embodiment, the electrodes are comprised of layers of titanium aluminum nitride (TiAlN) and iridium. A dielectric layer 120 separates piezoelectric sensor 102 and strain sensor 104. Strain gauge 104 is formed of a thin film resistor material such as nickel chromium, silicon chromium and tantalum silicon nitride. In at least one embodiment, strain gauge 104 is formed of silicon chromium (SiCr).

Figure 2:
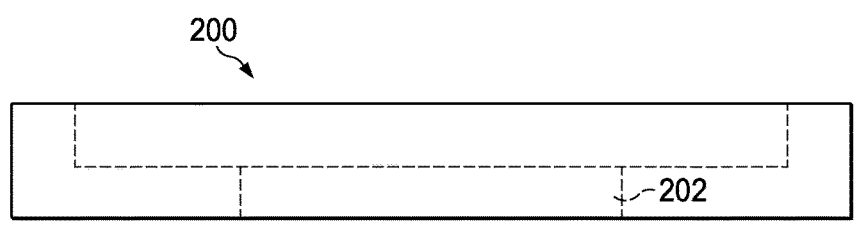
FIG. 2 depicts a side view of an etched lead frame that can allow flexure of the chip in the region of the switch according to an embodiment of the disclosure.

To increase the responsiveness of integrated force sensing element 100, a cavity can be created under the element of FIG. 1 during mounting. One embodiment of such a cavity is shown in FIG. 2, which illustrates a side view of a lead frame 200. Cavity 202 is created in lead frame 200 by etching and is located in the region that will underlie force sensing element 100 after mounting of the IC chip. To further increase the responsiveness of switch 100, the final silicon thickness is thinned to 100 microns or less. In at least one embodiment, the silicon thickness is thinned to less than 75 microns. In at least one embodiment, the final silicon thickness is thinned to less than 50 microns.

Figure 3:
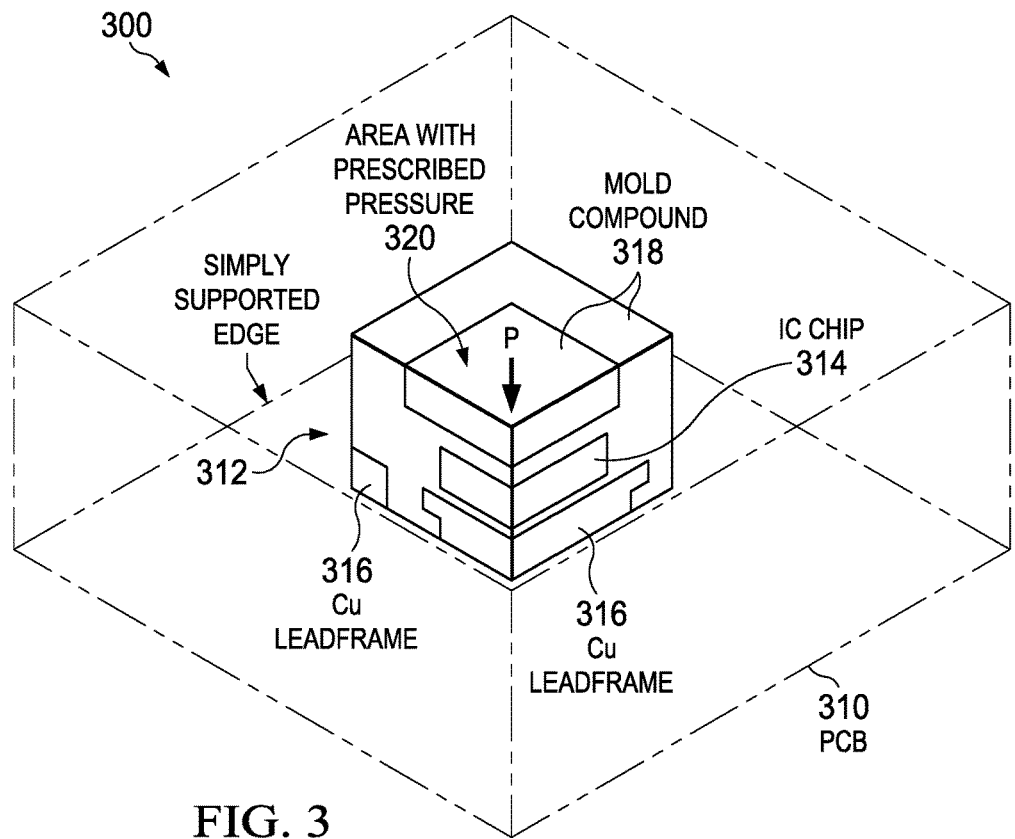
FIG. 3 depicts a packaging system that allows flexure of the chip in the region of the switch according to an embodiment of the disclosure.

FIG. 3 illustrates a packaging system that allows flexure of the chip in the region of switch 100. This figure illustrates a quarter-model of a Quad Flat No-leads (QFN) package 312 mounted to a printed circuit board (PCB) 310. QFN package 312 includes IC chip 314, which has been mounted to QFN lead frame 316 and encapsulated in mold compound 318. When the QFN lead frame 316 is soldered on PCB 310, a small gap exists between the bottom of QFN lead frame 316 at the center and PCB 310, creating the desired "cavity" with the standoff. Subsequently, when pressure is applied to area 320, IC chip 314 is able to flex enough to provide a spontaneous charge on the piezoelectric sensor formed within IC chip 314. Although only two methods of creating a cavity adjacent switch 100 have been shown, it will be understood that one skilled in the art can easily conceive of alternate embodiments to accomplish the same ends.

Figure 4A:
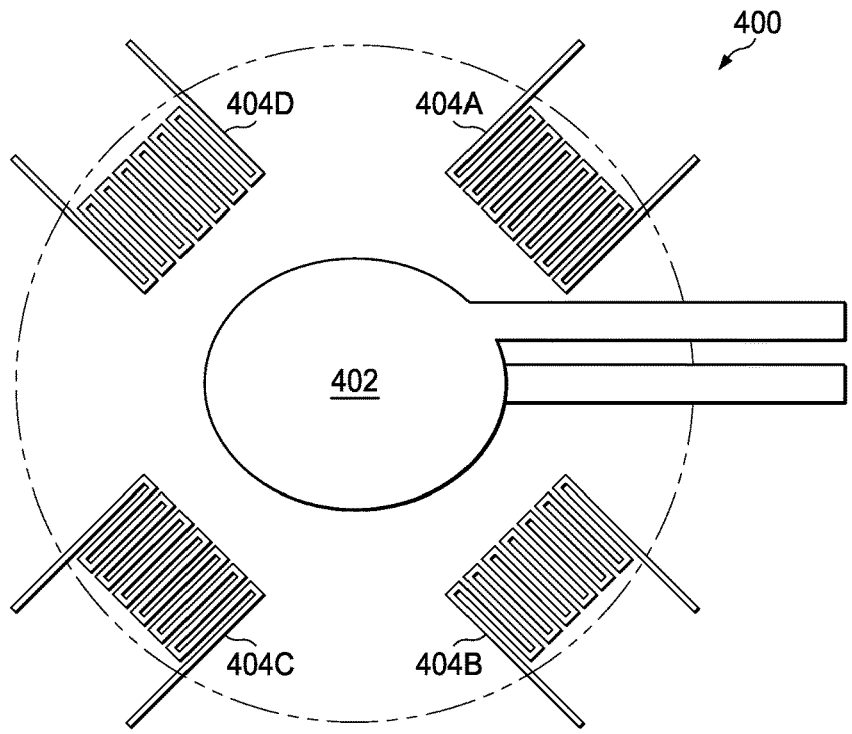
FIGS. 4A and 4B depict a top view and a side view of an example force sensing element according to an embodiment of the disclosure.
Figure 4B:
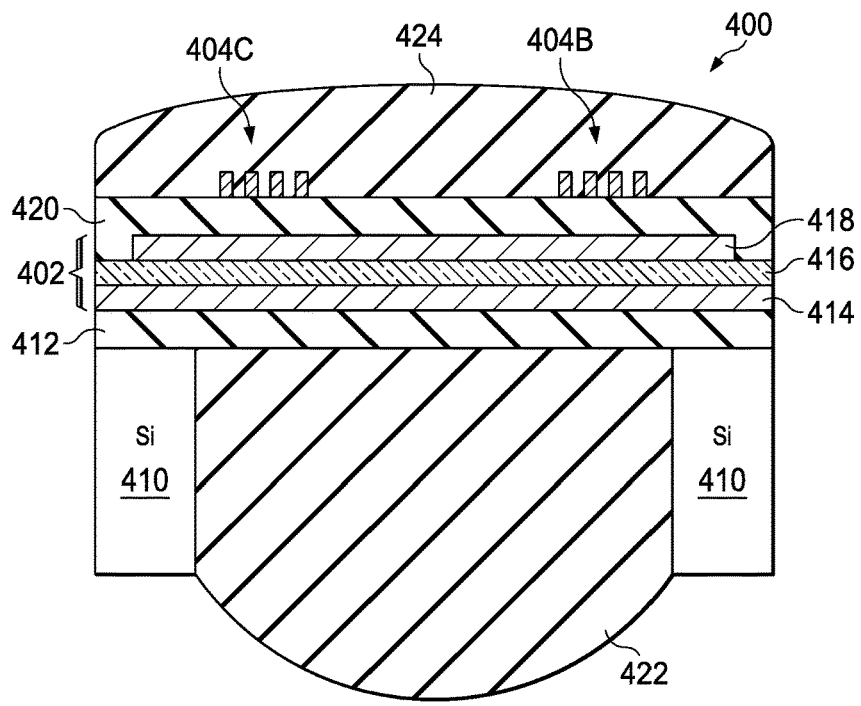

FIGS. 4A and 4B illustrate top and side views of an alternate version of a combined force sensing element 400. In this embodiment, switch 400 does not need to rely on the creation of a cavity during packaging or mounting. Instead, a micro-electromechanical system (MEMS) cavity is etched into silicon wafer 410, then filled with a compliant material 422. Once the cavity is created and filled, structural dielectric layer 412 is deposited before the formation of piezoelectric sensor 402. Piezoelectric sensor 402 includes first electrode 414, piezoelectric material 416, and second electrode 418. A further dielectric layer 420 separates second electrode 418 from the thin film resistor layer that forms strain gauge 404. Unlike the strain gauge of FIG. 1, each of strain gauges 404A, 404B, 404C, 404D follows a serpentine path. Compliant material 424 overlays switch 400 for protection. Compliant material layers 422 and 424, which may be the same material or of different materials, allow the membrane to move relative to the silicon wafer but prevent over travel and breakage. Further information on the piezoelectric sensor and MEMS cavity of FIG. 4 can be found in co-pending U.S. Patent Application No. 2015/0226618 to Wei-Yan Shih, which is hereby incorporated by reference.

Figure 5:
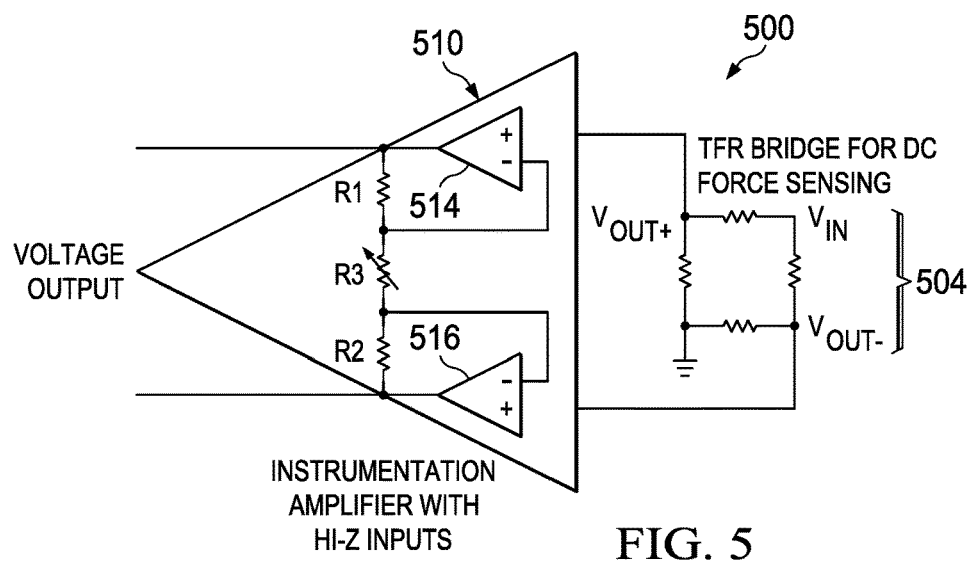
FIG. 5 depicts an example circuit for sensing DC force according to an embodiment of the disclosure.

The piezoelectric layer and the thin film resistor in the disclosed embodiments will receive the same strain as the top surface of the silicon. The following figures illustrate circuits to capture and measure the amount of strain using the piezoelectric sensor and the strain gauge. FIG. 5 illustrates a circuit 500 for DC force sensing using a strain gauge, such as strain gauge 104. Circuit 500 includes four thin film resistors connected to form a Wheatstone bridge 504, with an input voltage Vin and ground connected to opposite sides of the bridge. Outputs Vout+ and Vout− of Wheatstone bridge 504 are connected to the input terminals of a high input impedance instrumentation amplifier 510. Instrumentation amplifier 510 contains input buffer amplifiers 514, 516, each of which have their inverting input tied to a voltage divider connected between the two outputs of instrumentation amplifier 510. The voltage divider includes fixed resistors R1 and R2, each connected between the inverting input of one of input buffer amplifiers 514, 516 and a corresponding output, and variable resistor R3 connected between resistors R1 and R2. Circuit 500 can be checked periodically to detect long term stress changes to the disclosed switch. The output signal of Wheatstone bridge 504 is a signal corresponding to the strain applied to the surface of the IC chip in which the Wheatstone bridge is built. One skilled in the art will recognize that other configurations of the resistors besides a Wheatstone bridge can also be used.

Figure 6:
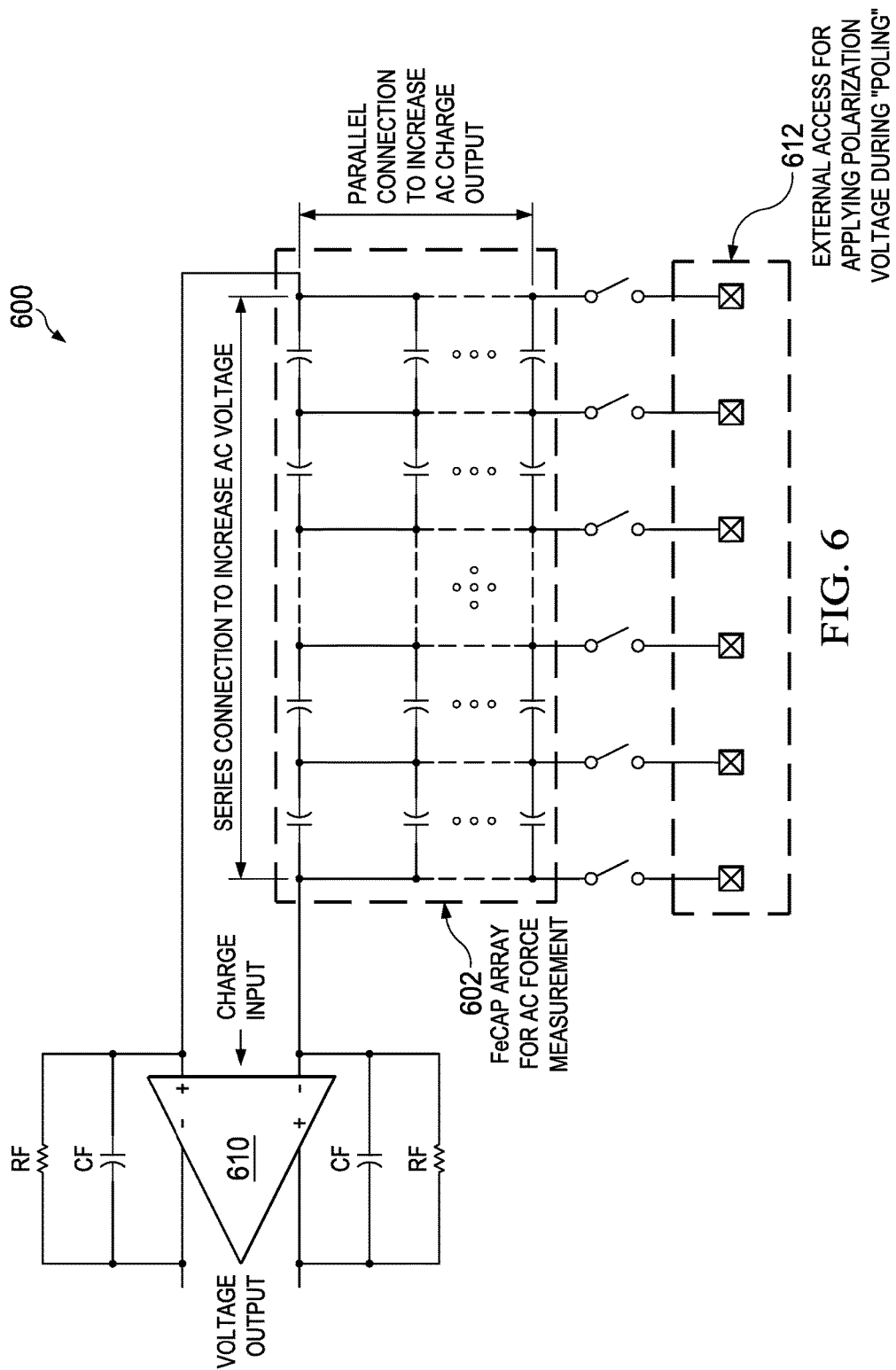
FIG. 6 depicts an example of a ferroelectric capacitor (FeCAP) array for AC force measurement according to an embodiment of the disclosure.

In contrast to the DC measurements of FIG. 5, FIG. 6 illustrates circuit 600 for AC force sensing using a piezoelectric sensor, such as sensor 102. In this embodiment, the piezoelectric sensor comprises a FeCAP array 602, with the terminals of FeCAP array 602 connected to the inputs of dedicated charge amplifier 610. Each input terminal of charge amplifier 610 and the respective output terminal are connected in parallel with a capacitor CF and a resistor RF. Charge amplifier 610 balances the charge injected into each input by charging the corresponding feedback capacitor CF. Resistors RF bleed the charge off a corresponding capacitor CF at a low rate to prevent the amplifier from drifting into saturation. Resistors RF also provide a DC bias path for the inputs. The value of RF and CF set the cutoff frequency of the amplifier. FeCAP array 602 includes a number of ferroelectric capacitors, arranged in a series and parallel combination for optimal interfacing with CMOS electronics. The series connections increase the output voltage when an AC force is incident, while the parallel connections increase the sensor capacitance, thereby making the sensor robust to parasitic capacitors at the interface to the amplifier. Although the disclosed embodiment shows twelve FeCAPs, it will be understood that this is for example only and is not a limiting factor. External access 612 to array 602 is provided in order that a polarization voltage can be applied during poling. Poling forces the micro-dipoles in the ferroelectric material into a desired alignment by subjecting the ferroelectric material to a high electric field for a short period of time.

Figure 7:
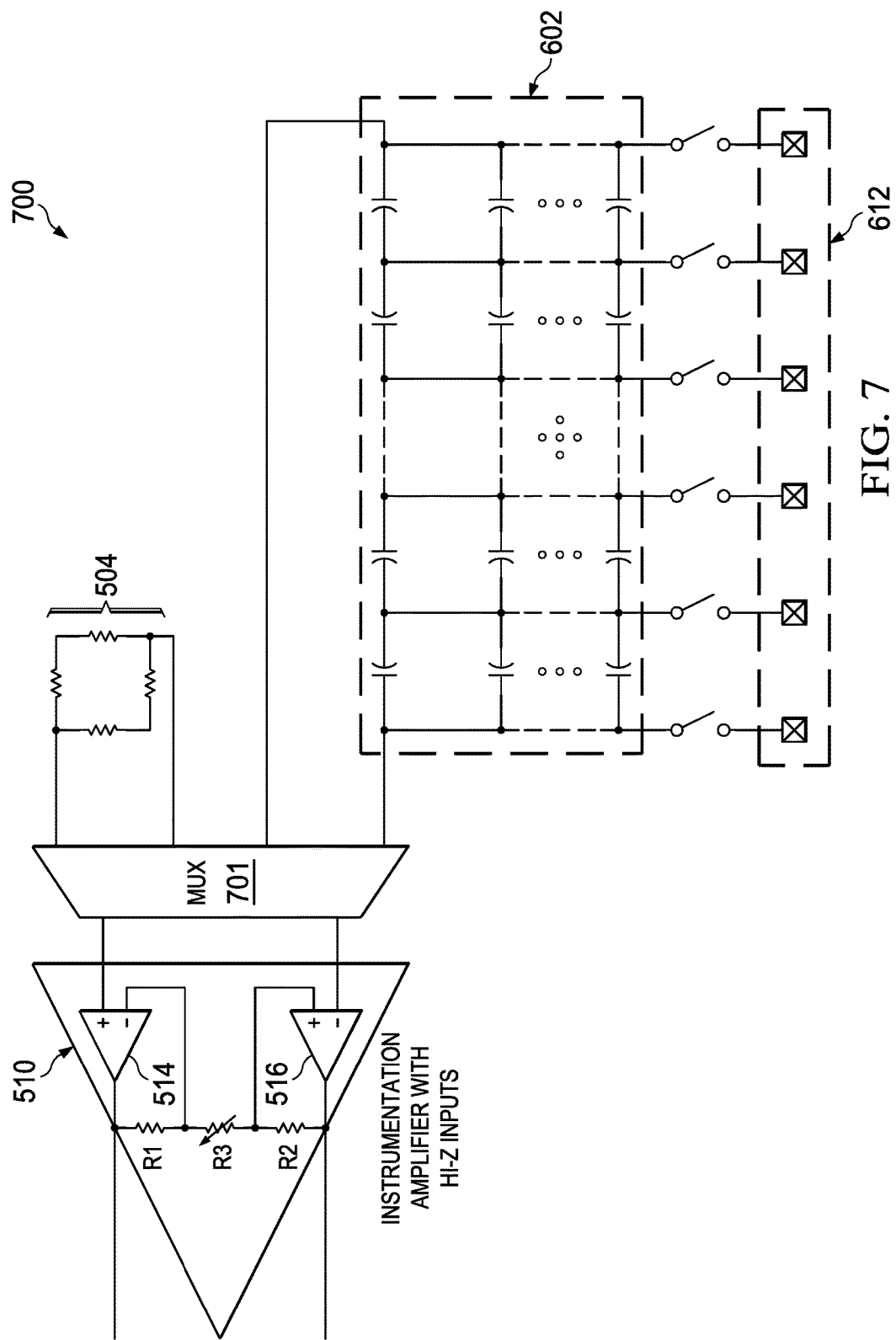
FIG. 7 depicts an example of an integrated force sensing element according to an embodiment of the disclosure.

When both FeCAPS and TFRs are available for DC and AC force sensing, as disclosed herein, the architecture shown in FIG. 7 can be used for reading both the DC and AC components of the force. Circuit 700 includes instrumentation amplifier 510 with high impedance inputs. TFR bridge 504 and FeCAP array 602 are each connected to inputs of multiplexor 701, which in turn is connected to the input terminals of instrumentation amplifier 510. The two components of force can then be read in a time multiplexed fashion.

Figure 8A:
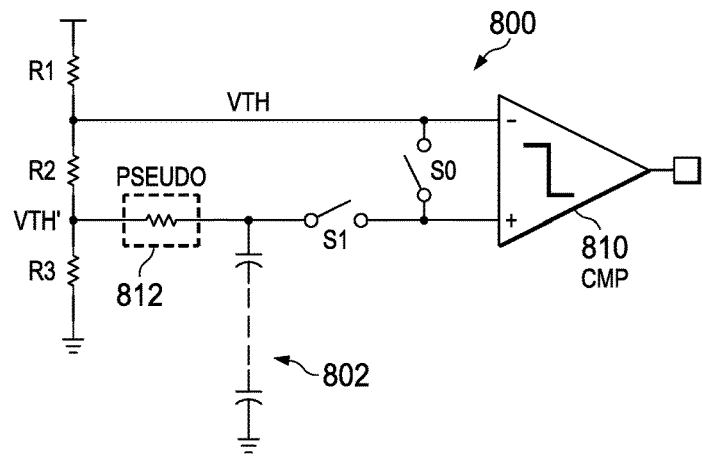
FIG. 8A depicts an example of a force sensing element that acts as a motion sensor according to an embodiment of the disclosure.

FIG. 8A illustrates a sub-micro watt power wake-up system 800, which uses a FeCAP array as disclosed to detect motion and provide a wake-up signal as output of system 800 according to an embodiment of the disclosure. When system 800 experiences motion, a voltage will appear on FeCAP array 802, circuit 800 measures the resulting voltage against a threshold VTH. When the voltage on FeCAP array 802 goes over the threshold, a signal is triggered. A resistive voltage divider comprising resistors R1, R2, R3 provides voltages of VTH and VTH' to respective connection points. Threshold voltage VTH is provided directly to the non-inverting input of comparator 810. Pseudo-resistor 812 is connected between VTH' and switch S1, while switch S1 is connected to the inverting input of comparator 810. FeCAP array 802 is attached to a connection point between pseudo-resistor 812 and switch S1. Although FeCAP array 802 is shown as only two capacitors, it will be understood that this is for simplification and illustration only and is not a limitation.

Figure 8B:
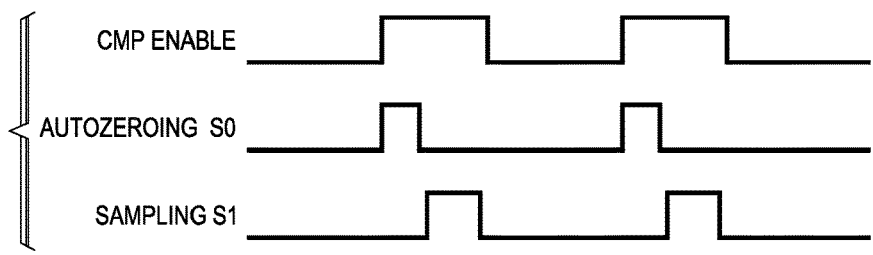
FIG. 8B illustrates a timing diagram associated with the force sensing element of FIG. 8A.

Pseudo-resistor 812 is a resistive element implemented as one or more transistors and acts as a biasing circuit for FeCAP array 802. Switch S0, when closed, connects the inverting and non-inverting inputs of comparator 810 and provides for autozeroing of the comparator, while switch S1 allows sampling of FeCap array 802 via comparator 810. In this figure, comparator power consumption can be reduced by duty cycling signal, CMP Enable (not specifically shown). However, the resistive voltage divider will consume static power. FIG. 8B illustrates a timing diagram of the CMP Enable signal, autozeroing signal (S0) and sampling signal (S1) are shown below the circuit. As shown, during the period when comparator 810 is enabled, switch S0 is first closed to provide autozeroing of the comparator; as soon as switch S0 is opened, switch S1 is closed to allow sampling of FeCAP array 802.

Figure 9A:
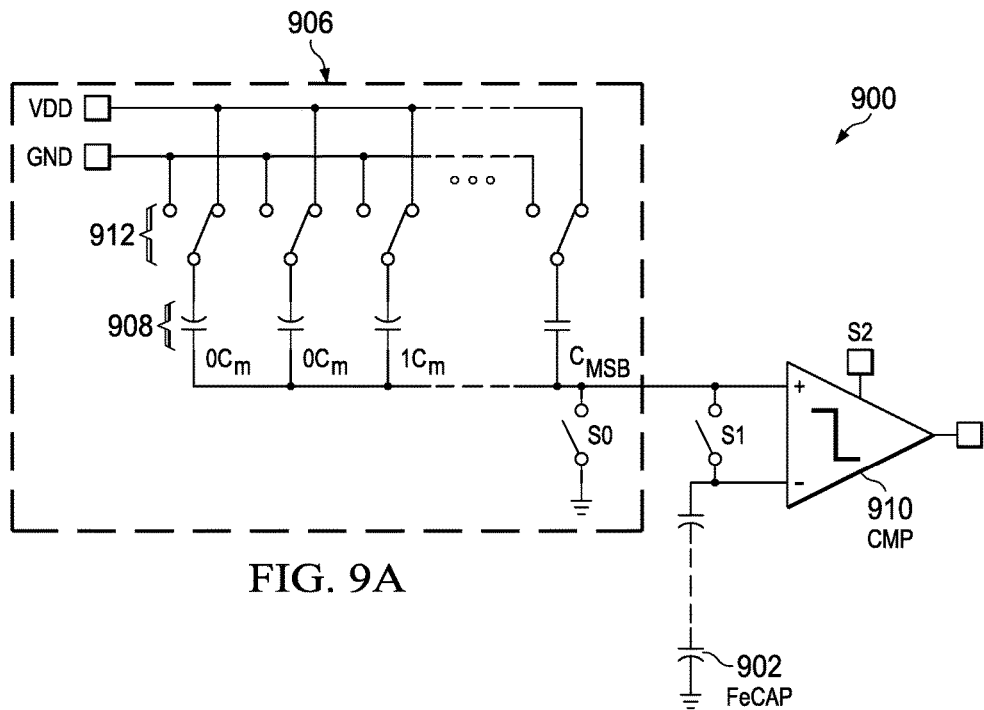
FIG. 9A depicts an example of the force sensing element of FIG. 8A in which the resistors are replaced by a capacitor DAC to decrease static power consumption according to an embodiment of the disclosure.

FIG. 9A illustrates an embodiment of FIG. 8A in which resistors R1, R2, R3 and pseudo-resistor 812 are replaced by a switched capacitor Digital-to-Analog Converter (DAC) 906, which may be a binary-weighted DAC. Capacitors 908 are connected in parallel to provide equivalent series resistances, with the right-most capacitor in this example providing the most significant bit. A first terminal of each of capacitors 908 can be switched to connect to either VDD or ground, while the second terminals are connected to the non-inverting input of comparator 910 and can be switched to connect to ground using switch S0. FeCAP array 902 is connected between the inverting input of comparator 910 and ground. Switch S1, when closed, connects the switched capacitor DAC 906 to FeCAP array 902. Circuit 900 is operable to quantify the amount of charge that appears on FeCAP array 902, and can provide a switch with multiple settings.

Figure 9B:
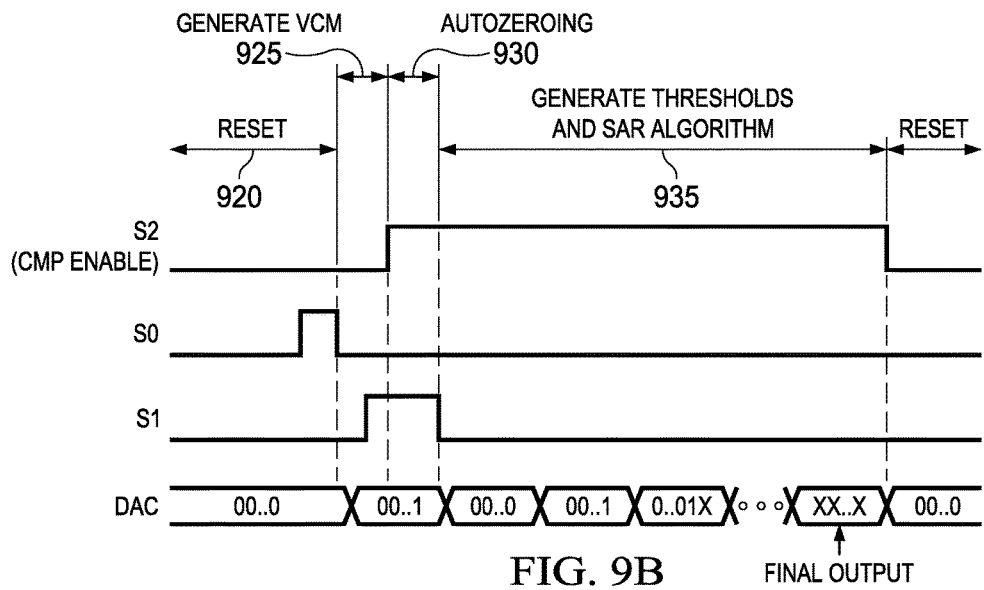
FIG. 9B illustrates a timing diagram associated with the force sensing element of FIG. 9A.

The operation of circuit 900 is discussed with reference to FIG. 9B as follows:

Initially, switches S0, S1, S2 are all open;

Switch S0 is closed and switches 912 of DAC 906 are set to 000 . . . 0 to provide a reset 920 of DAC 906;

Switch S0 is opened and switches 912 are set to 000 . . . 1 to generate voltage common mode (VCM) 925, i.e. VDD/2 at the output of DAC 906;

Switch S1 is then closed to provide VDD/2 as a bias value at the output of FeCAP array 902;

Switch S2 is closed to enable comparator 910 and provide autozeroing 930, followed by opening switch S1;

Desired thresholds can then be provided on DAC 906; and

Comparisons 935 of FeCAP array 902 to the current value of DAC 906 are made.

In at least one embodiment, a successive approximation register (SAR) algorithm is used to provide the thresholds on DAC 906 for comparison. In at least one embodiment, FeCAP array 902 can be compared to thresholds one step above and one step below the normal value for FeCAP array 902. If, for example, FeCAP array 902 has received a negative voltage, the thresholds can be set lower until the appropriate value is found. Simulations have shown that the proposed architecture can consume less than 1 µW.

Figure 10:
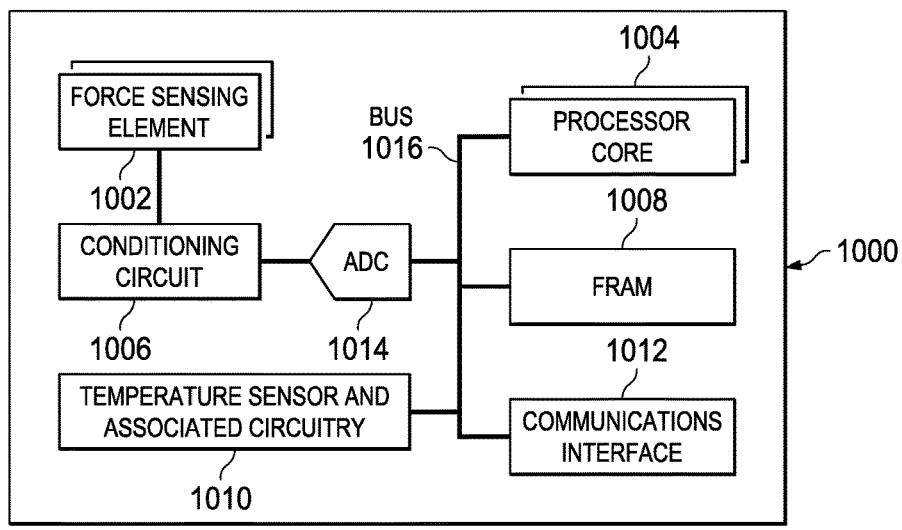
FIG. 10 depicts a block diagram of an example human-machine interface according to an embodiment of the disclosure.

FIG. 10 depicts a block diagram of human-machine interface system 1000 according to an embodiment of the disclosure. As seen in this figure, HMI system 1000 includes one or more force sensing elements 1002, one or more processor cores 1004, conditioning circuit 1006, FRAM 1008, temperature sensor and associated circuitry 1010, communications interface 1012, and analog-to-digital converter (ADC) 1014, each of which is connected to a common bus circuit 1016, either directly or through other elements. Force sensing element 1002 combines an integrated piezoelectric sensor and strain gauge as has been disclosed herein. In at least one embodiment, force sensing element 102 is implemented as a push button. In at least one embodiment, force sensing element 102 is part of a larger surface and provides an area that is sensitive to varying levels of pressure. In at least one embodiment, force sensing element 102 is a motion detector that detects motion of an object in which the sensor is embedded. In at least one embodiment, force sensing element 102 provides a multilevel output signal and enables multiple levels of decisions by the circuit to which the output of force sensing element 1002 is provided.

Conditioning circuit 1006 receives the signals from force sensing element(s) 1002 and provides conditioned signals to an analog-to-digital converter (ADC) 1014, which in turn provides the converted signal to processor core(s) 1004. In at least one embodiment, ADC 1014 is included in processor core 1004. The conditioning provided by conditioning circuit 1006 may include amplification of the signal, as is known to one skilled in the art. In one embodiment, processor core 1004 is a microcontroller. FRAM 1008 can be used as memory for a system that also contains FeCAPs or other ferroelectric components. In at least one embodiment, formation of the FeCAPs forming part of force sensing element 1002 and FRAM 1008 are formed on a single chip using the same processing steps to simultaneously form both components.

Temperature changes can cause a voltage to appear across the electrodes of any piezo transducer, even without the application of force, due to the pyroelectric properties of piezoceramic. Temperature also affects other properties of piezoceramics, such as elastic, dielectric and piezoelectric coupling. In order to allow adjustments for voltages caused by temperature, temperature sensor and associated circuitry 1010 is provided in the system. The circuitry associated with temperature sensor may include its own conditioning circuit (not specifically shown) and ADC (also not shown). If ADC 1014 is included in processor core 1004, a multiplexor (not specifically shown) may be used to receive data from various sensors including force sensing element 1002 and temperature sensor 1010 in a time multiplexed fashion. Finally, communications interface 1012 provides a means by which processor core 1004 can provide a signal to another circuit or machine in response to input received at force sensing element 1002. In at least one embodiment, the signal is sent wirelessly. In at least one embodiment, HMI system 1000 is integrated into a larger system so that force sensing element 1002 can provide a switched input to the larger system. It will be understood that the components of HMI system 1000 can be provided as separate components. In at least one embodiment, force sensing element 1002 and one or more of the other elements of HMI system 1000 are provided on a single IC chip.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. An integrated force sensing element comprising:
   a silicon layer having opposite first and second surfaces;
   a first dielectric layer on the second surface;
   a piezoelectric sensor including: a first electrode on the first dielectric layer, a piezoelectric material on the first electrode, and a second electrode on the piezoelectric material;
   a second dielectric layer on the second electrode;
   a strain gauge on the second dielectric layer, the strain gauge at least partially overlying the piezoelectric sensor, the strain gauge including four thin film resistors forming a Wheatstone bridge;
   a printed circuit board: and
   a lead frame mounted to the printed circuit board, the first surface of the silicon layer being attached to the lead frame, with a cavity interposed between the printed circuit board and the piezoelectric sensor.

2. The integrated force sensing element of claim 1, wherein the silicon layer having a thickness of 75 microns or less.

3. The integrated force sensing element of claim 2, wherein the silicon layer having a thickness of 50 microns or less.

4. The integrated force sensing element of claim 1, wherein at least part of the cavity extends through the lead frame to the first surface.

5. The integrated force sensing element of claim 1, wherein the cavity is interposed between the printed circuit board and the lead frame.

6. The integrated force sensing element of claim 1, wherein at least part of the cavity is formed by etching the lead frame.

7. The integrated force sensing element of claim 1, further comprising a mold compound encapsulating at least the second dielectric layer and the strain gauge.

8. The integrated force sensing element of claim 1, wherein the piezoelectric sensor includes a ferroelectric material selected from a group consisting of: lead zirconate titanate (PZT), aluminum nitride (AlN), and zinc oxide (ZnO).

9. The integrated force sensing element of claim 1, wherein the strain gauge includes silicon chromium (SiCr).

10. The integrated force sensing element of claim 1, wherein the silicon layer includes a signal conditioning circuit, the signal conditioning circuit including: a first input coupled to the piezoelectric sensor; a second input coupled to the strain gauge; and a conditioned signal output.

11. A human machine interface (HMI) comprising:
an integrated force sensor including:
a silicon layer having opposite first and second surfaces;
a first dielectric layer on the second surface;
a piezoelectric sensor including a first electrode on the first dielectric layer, a piezoelectric material on the first electrode, and a second electrode on the piezoelectric material;
a second dielectric layer on the second electrode; and
a strain gauge on the second dielectric layer, the strain gauge at least partially overlying the piezoelectric sensor, the strain gauge including four thin film resistors forming a Wheatstone bridge;
a printed circuit board; and
a lead frame mounted to the printed circuit board, the first surface of the silicon layer being attached to the lead frame, with a cavity interposed between the printed circuit board and the piezoelectric sensor;
a processor core; and
a conditioning circuit including: a first input coupled to the piezoelectric sensor; a second input coupled to the strain gauge and a conditioned signal output counted to the processor core.

12. The HMI of claim 11, wherein the silicon layer having a thickness of 75 microns or less.

13. The HMI of claim 11, wherein at least part of the cavity extends through the lead frame to the first surface.

14. The HMI of claim 11, wherein the cavity is interposed between the printed circuit board and the lead frame.

15. The HMI of claim 11, wherein at least part of the cavity is formed by etching the lead frame.

16. The HMI of claim 11, further comprising a mold compound encapsulating at least the second dielectric layer and the strain gauge.

17. The HMI of claim 11, wherein the piezoelectric sensor includes a ferroelectric material selected from a group consisting of: lead zirconate titanate (PZT), aluminum nitride (AlN), and zinc oxide.

18. The HMI of claim 11, wherein the strain gauge includes silicon chromium (SiCr).

19. The HMI of claim 11, wherein at least one of the processor core, the conditioning circuit, a random access memory (RAM), a temperature sensor or a communications interface is formed in the silicon layer.

* * * * *